United States Patent
Henning et al.

(10) Patent No.: US 7,090,464 B2
(45) Date of Patent: Aug. 15, 2006

(54) METHODS AND APPARATUS FOR ASSEMBLING ROTATABLE MACHINES

(75) Inventors: Thomas Richard Henning, Cincinnati, OH (US); John Douglas Mickol, Cincinnati, OH (US); Daniel Edward Mollmann, Cincinatti, OH (US); Michael Harvey Schneider, Loveland, OH (US); Andrew Breeze-Stringfellow, Cincinnati, OH (US); Max Farson, West Chester, OH (US)

(73) Assignee: General Electric Company, Schenectady, NY (US)

( * ) Notice: Subject to any disclaimer, the term of this patent is extended or adjusted under 35 U.S.C. 154(b) by 154 days.

(21) Appl. No.: 10/889,945

(22) Filed: Jul. 13, 2004

(65) Prior Publication Data
US 2006/0013692 A1    Jan. 19, 2006

(51) Int. Cl.
*F01D 5/10* (2006.01)
*B21K 25/00* (2006.01)

(52) U.S. Cl. .................... 416/61; 416/144; 416/219 R; 29/889.22

(58) Field of Classification Search ................ 73/66; 29/889.2, 889.22; 700/279; 416/219 R, 416/61, 214 A, 215, 144, 248, 500
See application file for complete search history.

(56) References Cited

U.S. PATENT DOCUMENTS

| 4,253,800 | A |  | 3/1981  | Segawa et al. |  |
|---|---|---|---|---|---|
| 4,474,534 | A |  | 10/1984 | Thode |  |
| 4,602,412 | A | * | 7/1986  | Partington et al. | ........ 29/889.22 |
| 4,732,532 | A |  | 3/1988  | Schwaller et al. |  |
| 4,767,272 | A |  | 8/1988  | Kildea |  |
| 4,883,240 | A |  | 11/1989 | Adamson et al. |  |
| 5,537,861 | A |  | 7/1996  | Seitelman et al. |  |
| 5,681,145 | A |  | 10/1997 | Neely et al. |  |
| 6,004,101 | A | * | 12/1999 | Schilling et al. | ............ 416/224 |
| 6,908,285 | B1 | * | 6/2005 | Henning et al. | ............ 416/144 |
| 2004/0013523 | A1 | * | 1/2004 | Berger et al. | ................... 416/1 |

FOREIGN PATENT DOCUMENTS

| EP | 1467063 A1 | 10/2004 |
|---|---|---|
| GB | 2245661 A | 7/1990 |

OTHER PUBLICATIONS

European Search Report; United Kingdom; Sep. 12, 2005; Examiner Jake Collins; Application No. GB0513952-2; Reference 13DV149842/10809; 3 pgs.

* cited by examiner

*Primary Examiner*—Igor Kershteyn
(74) *Attorney, Agent, or Firm*—William Scott Andes; Armstrong Teasdale LLP

(57) ABSTRACT

A method and apparatus for ordering blades in a rotatable machine is provided. The machine includes a plurality of blades that extend radially outwardly from a rotor. The method includes determining a moment weight of each blade in a row of blades, determining a geometric parameter of each blade in the same row of blades, and determining a mapping order of each blade using the moment weight and the geometric parameter. The apparatus includes a computer system that includes a software product code segment for minimizing imbalance in a bladed rotor wherein the segment is configured to receive a moment weight value for each blade to be installed in said rotor, receive a geometric parameter value for each blade to be installed in said rotor, calculate a blade location on the rotor based on the received values, and generate a blade map based on the calculated location.

20 Claims, 5 Drawing Sheets

METHODS AND APPARATUS FOR ASSEMBLING ROTATABLE MACHINES

BACKGROUND OF THE INVENTION

This invention relates generally to gas turbine engines and, more particularly, to methods and apparatus for ordering blades in rotatable machines.

Gas turbines are used in different operating environments, such as, to provide propulsion for aircraft and/or to produce power in both land-based and sea-borne power systems. At least some known gas turbine engines include a core engine having, in serial flow arrangement, a fan assembly and a high pressure compressor that compress airflow entering the engine. A combustor ignites a fuel-air mixture that is then channeled through a turbine nozzle assembly towards high and low pressure turbines. The turbines each include a plurality of rotor blades that extract rotational energy from airflow exiting the combustor.

At least some known turbofan gas turbine engines include a fan assembly that includes a plurality of fan blades extending radially outwardly therefrom. During normal operation, gas turbine engines may experience high rotational speeds, and any imbalance of the rotor may induce vibrational stresses to the rotor and/or rotor bearings and/or support structures. Over time, continued operation with such stresses may lead to premature failure of the bearings, bearing support structure, and/or rotor components.

Moreover, at least some known commercial jet engine fans operate with a relative blade tip Mach number in the transonic regime and may be subject to an operating characteristic called multiple-pure-tone (MPT) noise, or buzzsaw noise. Such noise may occur if at least some blades are oriented differently relative to other blades extending around the circumference of the fan case. Moreover, such noise may occur if blade-to-blade geometry variations exist within the fan. As a result, variations may exist within the fan assembly in the amplitude (strength) and/or spacing of the shockwaves originating from those portions of the blades that have sonic or supersonic velocities. Specifically, at axial locations close to the fan blades, the noise due to the shock waves is generally at multiples of the fan shaft per revolution frequency, which is the frequency with which one point on the shaft passes any particular fixed point as it rotates.

Shock waves of different strengths may propagate at different speeds. Accordingly, as the shock waves travel away from the blades, the noise at a blade passing frequency degenerates into a broad spectrum of lower frequency tones as the shock waves merge with each other. Buzzsaw noise may be an issue with passenger annoyance and comfort, and may also adversely affect community noise levels.

To facilitate minimizing imbalance and multiple pure tone noise of the fan during operation, at least some known fan assemblies are assembled in a controlled manner. For example, one control that may be used in assembling fan rotors involves mapping each fan blade into specific slots in the fan base. Within other known fan assemblies, a moment weight of each fan blade is determined and is used to map each blade into specific fan base slots. However, because the geometry of adjacent blades may be different, during operation a rotor may still experience a shift in balance and/or pure tone noise that is not associated with the moment weight of each blade but due to different aerodynamic loading between blades.

BRIEF DESCRIPTION OF THE INVENTION

In one embodiment, a computer-implemented method of ordering blades in a rotatable machine is provided. The rotatable machine may include a plurality of blades that extend radially outwardly from a rotor. The method includes receiving a geometric parameter measurement of each blade in a row of blades, determining a root sum squared value of a difference of the geometric parameter measurement between adjacent blades in the row of blades, and determining a sequence map of each blade using root sum squared value of the difference of the geometric parameter measurement between adjacent blades in the row of blades.

In another embodiment, a rotor assembly is provided. The rotor assembly includes a disk having a plurality of circumferentially-spaced blade root slots defined therein, and a plurality of blades, each blade having a root, a tip, and an airfoil therebetween, each blade is positioned within a pre-determined slot based on a blade map wherein the blade map is generated by a computer system that is configured to receive a geometric parameter measurement of each blade in a row of blades, determine a root sum squared value of a difference of the geometric parameter measurement between adjacent blades in the row of blades, and determine a sequence map of each blade using root sum squared value of the difference of the geometric parameter measurement between adjacent blades in the row of blades.

In yet another embodiment, a computer system including a software product code segment for facilitating reducing multiple pure tone noise and imbalance in a bladed rotor is provided. The software code segment is programmed to receive a geometric parameter measurement of each blade in a row of blades, determine a root sum squared value of a difference of the geometric parameter measurement between adjacent blades in the row of blades, and determine a sequence map of each blade using root sum squared value of the difference of the geometric parameter measurement between adjacent blades in the row of blades.

DETAILED DESCRIPTION OF THE INVENTION

Figure 1:
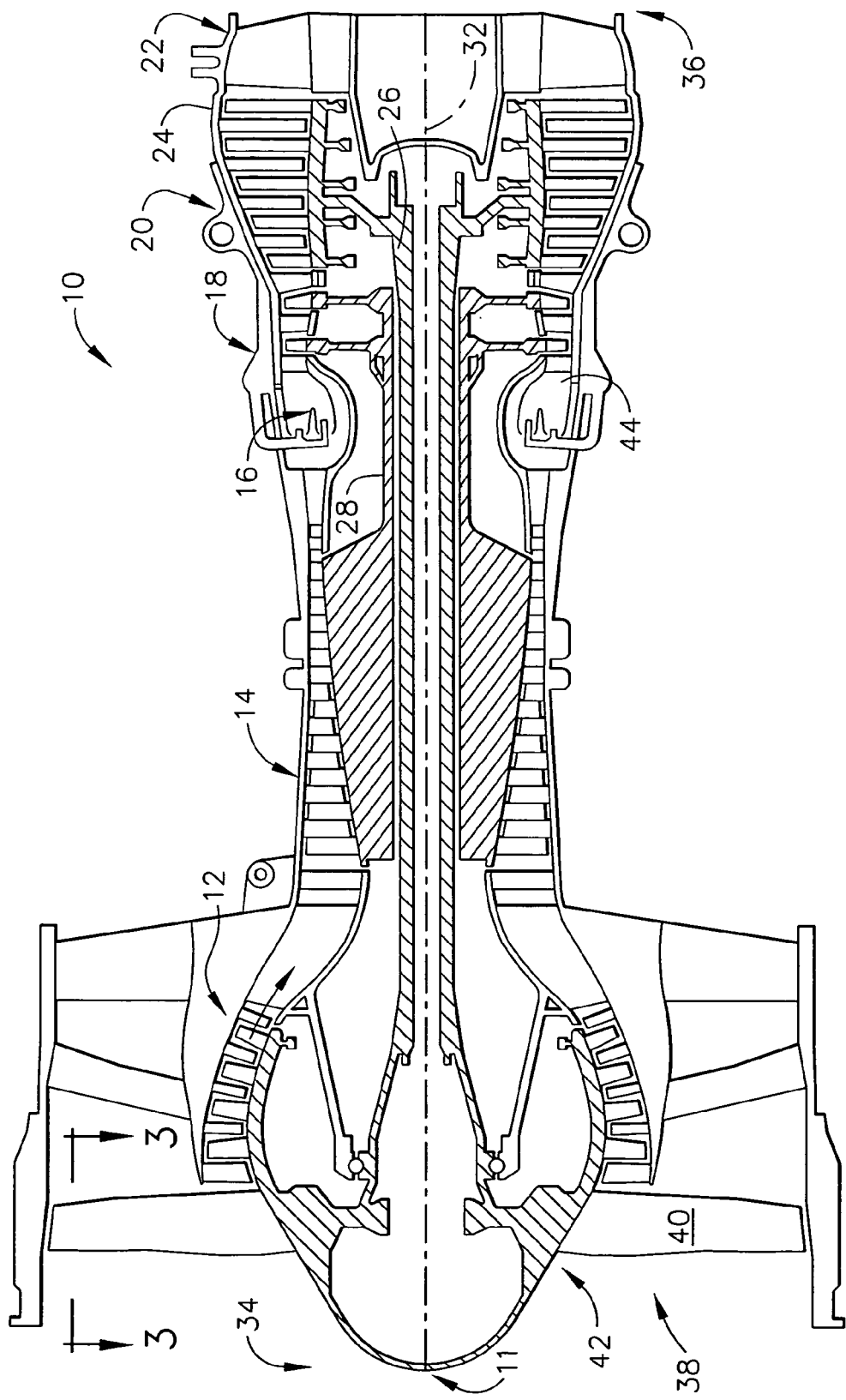
FIG. 1 is a schematic illustration of an exemplary gas turbine engine.

FIG. 1 is a schematic illustration of an exemplary gas turbine engine 10 including a rotor 11 that includes a low-pressure compressor 12, a high-pressure compressor 14, and a combustor 16. Engine 10 also includes a high-pressure turbine 18, a low-pressure turbine 20, an exhaust frame 22 and a casing 24. A first shaft 26 couples low-pressure compressor 12 and low-pressure turbine 20, and a second shaft 28 couples high-pressure compressor 14 and high-pressure turbine 18. Engine 10 has an axis of symmetry 32 extending from an upstream side 34 of engine 10 aft to a downstream side 36 of engine 10. Rotor 11 also includes a fan 38, which includes at least one row of airfoil-shaped fan blades 40 attached to a hub member or disk 42. Blades 40 are substantially identical with respect to each other blade 40, except that there are some small differences due to manufacturing tolerances. Blades 40 are coupled to disk 42 in a substantially equi-angularly spaced relationship to each other. In one embodiment, gas turbine engine 10 is a GE90 engine commercially available from General Electric Company, Cincinnati, Ohio.

In operation, air flows through low-pressure compressor 12 and compressed air is supplied to high-pressure compressor 14. Highly compressed air is delivered to combustor 16. Combustion gases 44 from combustor 16 propel turbines 18 and 20. High pressure turbine 18 rotates second shaft 28 and high pressure compressor 14, while low pressure turbine 20 rotates first shaft 26 and low pressure compressor 12 about axis 32. During some engine operations, such as during takeoff operations and other operating periods when engine power output is relatively high, fan 38 rotates such that a radially outer portion of blades 40 attains supersonic velocity. As a result, the supersonically rotating portions of blades 40 may produce shockwaves, which can be heard as noise. The noise may be spread over a broad tonal range, from many multiples of blade passing frequency down to the disk rotational frequency.

Figure 2:
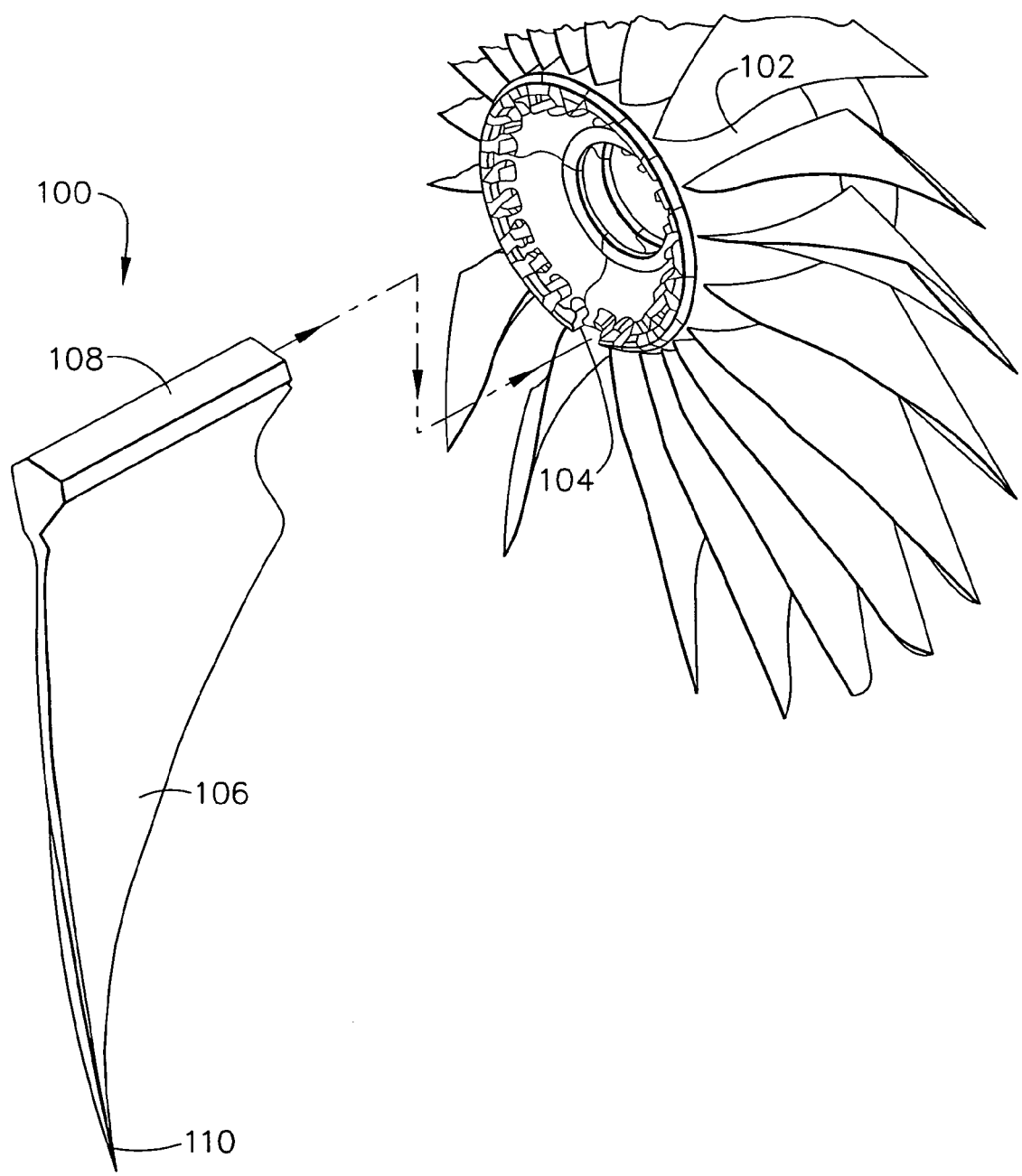
FIG. 2 is an exploded perspective view of an exemplary fan rotor and blading assembly that may be used with the gas turbine engine shown in FIG. 1.

FIG. 2 is an exploded perspective view of an exemplary composite blade 100 and fan rotor disk 102 that may be used with gas turbine engine 10. A plurality of circumferentially-spaced blades 100 are supported by rotor disk or drum 102 through a dovetail slot 104. Each blade 100 includes an airfoil 106 that extends between a dovetail root 108 and a blade tip 110 such that each blade 100 is supported through dovetail root 108 and dovetail slot 104 by rotor 102. Blade 100 is representative of the plurality of circumferentially-spaced blades 100 that are each mapped into a specific slot 104 based on measured parameters of blade 100. In the exemplary embodiment, each blade 100 includes a composite airfoil 106 that includes a plurality of layered composite plies (not shown). More specifically, each blade 100 includes a first plurality of structural and load carrying airfoil plies in airfoil 106 and a second plurality of root plies in root 108.

Figure 3:
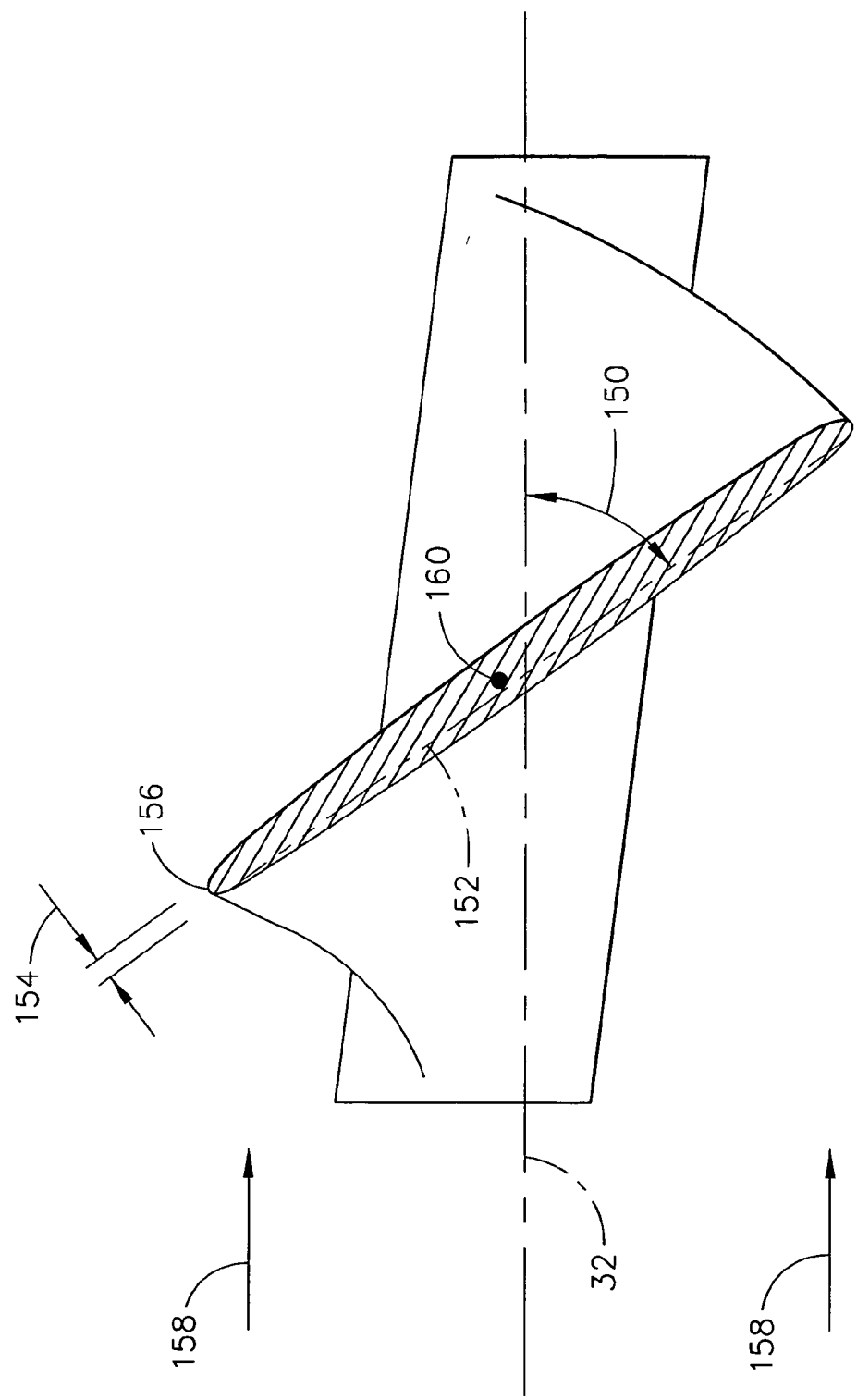
FIG. 3 is a cross-sectional view of an exemplary fan blade taken along line 3—3 shown in FIG. 1.

FIG. 3 is a cross-sectional view of an exemplary fan blade 40 taken along line 3—3 (shown in FIG. 1). An angle 150 represents an amount of section stagger angle of blade 40 at the cross-section of blade 40 illustrated. Generally, angle 150 is dependent on a radial distance from axis 32 to the cross-section of interest. In the exemplary embodiment, angle 150 is measured between a chord 152 at the cross-section and fan axis 32 of symmetry. A thickness 154 of blade 40 represents the thickness of a leading edge 156 of blade 40. Leading edge 156 is in relation to airflow 158 through fan 38. Each blade 40 includes a radial axis 160.

Factors of blade design that may affect pure multiple tone noise may be, for example, but are not limited to, differences of angle 150 from blade-to-blade, differences of thickness 154 from blade-to-blade, differences in the curvature of the blade airfoil at respective sections from blade-to-blade, and variations of spacing between adjacent blades.

Figure 4:
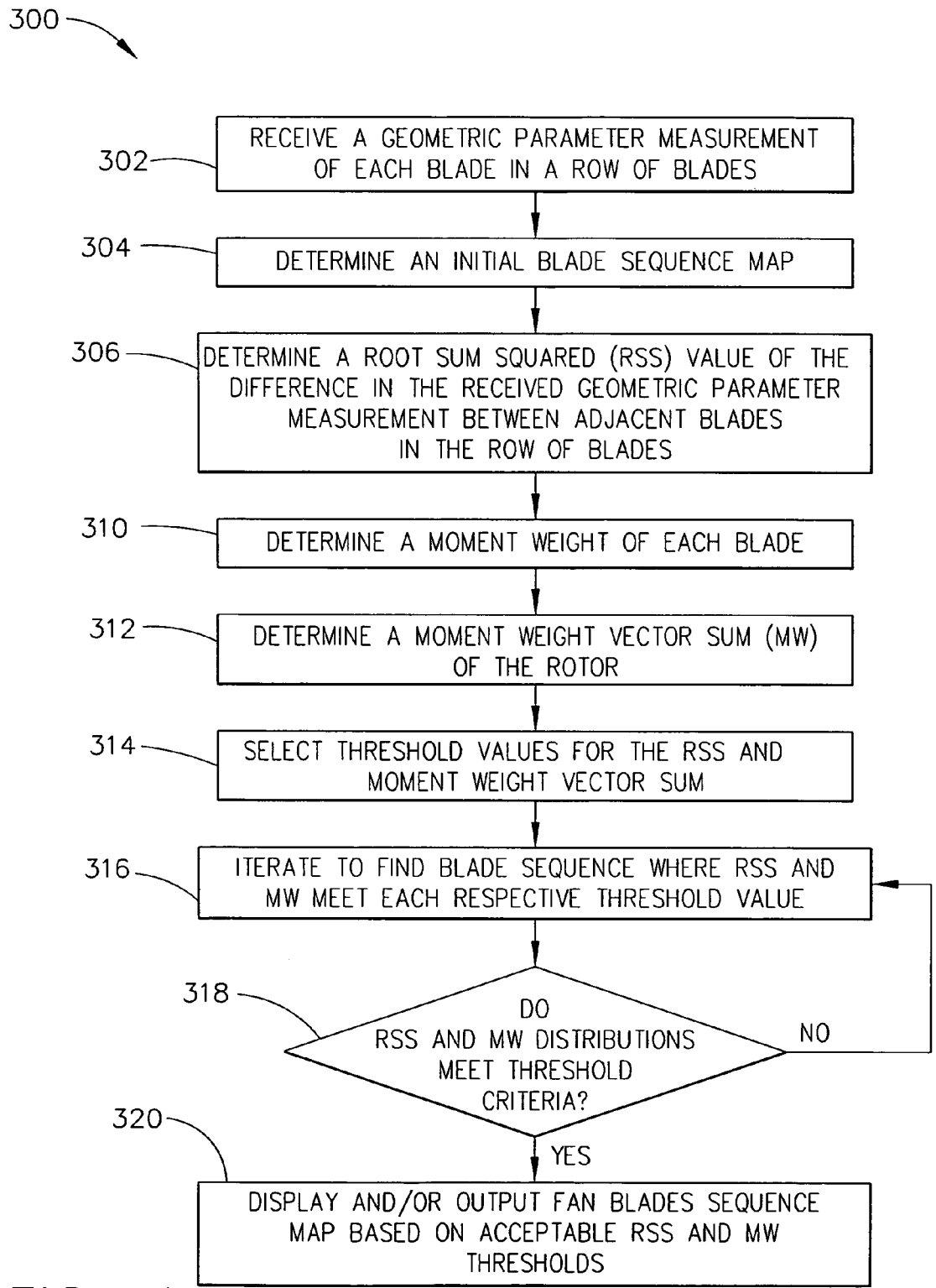
FIG. 4 is a flow diagram of an exemplary method for ordering blades in a rotatable machine, such as the turbine engine shown in FIG. 1.

FIG. 4 is a flow diagram of an exemplary method 300 that may be used for ordering blades in a rotatable machine, such as turbine 10 (shown in FIG. 1). In the exemplary embodiment, the machine is a gas turbine engine that includes a rotor, such as rotor 11, (shown in FIG. 1), that is rotatable about a longitudinal axis of symmetry of the engine. The rotor includes circumferentially-spaced slots for receiving the blades such that the blades extend radially between a blade root and a blade tip from the slots.

Method 300 includes receiving 302 a geometric parameter measurement of each blade in a row of blades. The fan blade geometric parameter may be based on a determination by an acoustics specialist and fan aerodynamics specialists relative to a customer specification. The geometric parameter may be any of a plurality of measurable blade parameters that contribute to a difference of a ratio of blade inlet area to blade exit area for adjacent blades. Such parameters may include, for example, but are not limited to, a blade section stagger angle, a blade tangential shift, and a blade thickness.

Each adjacent pair of blades defines a volume between the blades. The volume includes an inlet area extending between adjacent leading edges of the blades and an exit area extending between adjacent trailing edges of the blades. An inlet area to exit area ratio may be used to determine the geometric parameter that is used to map the blades into the rotor.

The blade section stagger angle may be defined as a rotation of at least a portion of a blade about a radial axis through a central region of the blade. The axis of stagger angle may be offset from a center radial axis of the blade, or may be coincident with the center radial axis. The blade tangential shift may be defined as a displacement of a blade tip in a circumferential direction in a plane of rotation of the row of blades containing the blade. The blade tangential shift may be used to quantify an amount that a blade is offset from a radial orientation and may also describe a blade that is bowed in the plane of rotation of the row of blades containing the blade. Blade thickness may refer to the thickness of the blade leading edge at a predetermined radial distance from the blade tip, the thickness of the blade trailing edge at a predetermined radial distance from the blade tip, and/or the thickness of the blade at a predetermined intermediate point at a predetermined radial distance from the blade tip. The geometric parameter measurement may be received from a blade manufacturer or may be determined after the blade is received at a manufacturing facility.

Prior to positioning blades onto the rotor disk, an initial or starting blade map is determined 304. A blade map may indicate a specific slot for each blade that will be assembled into the rotor and may indicate an order of installation of the blades. The starting position may be a "virtual" position, in that the blades are simulated being installed using a computer model of the rotor and blades. Subsequent iterative maps of blade location may also be virtual maps until a predetermined endpoint is reached during iteration, when a final blade map may be displayed and/or printed.

A root sum squared value of a difference of the selected geometric parameter measurement between adjacent blades in the row of blades may be determined 306 from blade geometry data supplied by the blade manufacturer or may be determined by the manufacturing facility after receipt. The following expression may be used to determine the root sum squared value:

$$\sqrt{\Sigma(\theta_{i+1}-\theta_i)^2} \text{ where}$$

$\theta_i$ and $\theta_{i+1}$ represent the selected geometric parameter selected for adjacent blades in a blade pair.

For example, a blade section stagger angle difference between adjacent blades may be determined by calculating a ratio of the inlet area to exit area for each pair of blades installed in a starting position around the circumference of the rotor. To determine a mapping order, a computer including a processor and a program code segment configured to select and deselect blades may be utilized. Specifically, when blades are selected in complementary pairs, a first blade may be selected for positioning in a specific slot based on the root sum squared value of the difference of the selected geometric parameter between each pair of blades, a moment weight, and/or aerodynamic or geometric parameters. Blades are iteratively arranged in an order that facilitates minimizing a combination of the vector sum of the moment weight of all the blades to be positioned on the rotor disk and the root sum squared value of the difference of the selected geometric parameter between each pair of blades. During the process of minimizing this combination of parameters, it may be necessary to completely reorder the selected blades. The computer system may then display the resultant blade map and generate a report detailing the selection process. Additionally, manual entry of blade parameters and recalculation of the blade map are supported.

The inlet area and/or exit area may be determined using a distance between adjacent blades at the same radial distance from the blade tip. Because at least some of the parameters that may be used to determine inlet area and exit area may be fixed, only a line distance may be used to determine ratio of the inlet area and outlet area. A moment weight of each blade in a row of blades may be determined 310 and a moment weight vector sum of the rotor may also be determined 312. The moment weight may be determined by horizontally supporting a blade by its root in a device designed to measure moment weight. A moment weight is based not only on a pan weight of the blade, but also is based on a distribution of the weight of the blade along a radial distance extending between the blade root to the blade tip. In a rotating machine, an uneven distribution of moment weight of each blade spaced about the rotor may affect a balance condition of the rotor.

Threshold values for the selected geometric parameters are determined 314. The threshold values may be determined from an engineering or design requirement contained within a drawing or other technical or administrative document. The initial blade sequence is iteratively remapped 316 to reduce the root summed squared value of the difference of the geometric parameter between each adjacent blade, and reduce the moment weight vector sum of the rotor to values that are less than the respective predetermined values. When the root summed squared value of the difference of the geometric parameters between adjacent blades, and the moment weight vector sum of the rotor are reduced 318 to values that are less than the respective predetermined values, the final blade sequence map may be displayed 320 and/or output.

Figure 5:
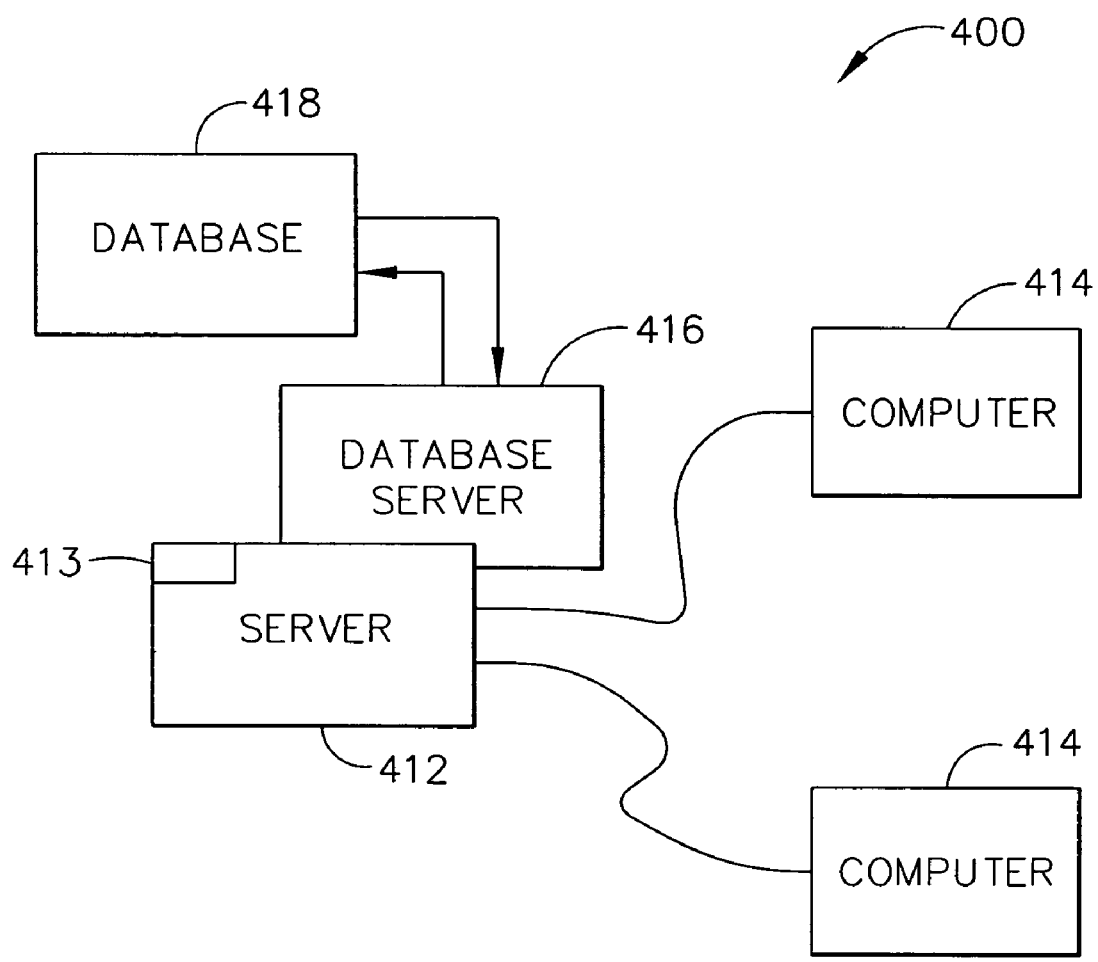
FIG. 5 is a simplified block diagram of an exemplary blade mapping computer system.

FIG. 5 is a simplified block diagram of a blade mapping computer system 400. As used herein, the term "computer" may include any processor-based or microprocessor-based system including systems using microcontrollers, reduced instruction set circuits (RISC), application specific integrated circuits (ASICs), logic circuits, and any other circuit or processor capable of executing the functions described herein. The above examples are exemplary only, and are thus not intended to limit in any way the definition and/or meaning of the term "computer". Computer system 400 includes a server system 412 including a disk storage unit 413 for data storage, and a plurality of client sub-systems, also referred to as client systems 414, connected to server system 412. In one embodiment, client systems 414 are computers including a web browser, such that server system 412 is accessible to client systems 414 via the Internet. Client systems 414 are interconnected to the Internet through many interfaces including a network, such as a local area network (LAN) or a wide area network (WAN), dial-in-connections, cable modems and special high-speed ISDN lines. Client systems 414 could be any device capable of interconnecting to the Internet including a web-based phone, personal digital assistant (PDA), or other web-based connectable equipment. A database server 416 is connected to a database 418 containing information regarding engine components. In one embodiment, centralized database 418 is stored on server system 412 and can be accessed by potential users at one of client systems 414 by logging onto server system 412 through one of client systems 414. In an alternative embodiment database 418 is stored remotely from server system 412 and may be non-centralized.

Example embodiments of systems and methods that facilitate reducing multiple pure tone noise in aircraft gas turbine engine fans are described above in detail. A technical effect of the systems and methods described herein includes reducing overall circumferential pressure differences between adjacent blade pairs to minimize fan tonal noise, and therefore reducing aircraft passenger annoyance and community noise levels.

The above-described blade mapping system is a cost-effective and highly reliable method and system that may be used for determining a blade map that reduces a root sum squared value of a difference of a geometric parameter measurement between adjacent blades to a value that is less than a predetermined threshold. The method also iteratively remaps the blades to reduce a rotor moment weight vector sum to a value that is less than a predetermined threshold. Each system is configured to receive a geometric parameter measurement and a moment weight value for each blade, determine an initial blade location on the rotor, and generate a blade map based on iteratively reducing the root sum squared value of a difference of the geometric parameter measurement value between adjacent blades and the rotor moment weight vector sum to values that are less than predetermined respective threshold values. Accordingly, the blade mapping method and system facilitates assembly, operation, and maintenance of machines, and in particular gas turbine engines, in a cost-effective and reliable manner.

Exemplary embodiments of blade mapping method and system components are described above in detail. The components are not limited to the specific embodiments described herein, but rather, components of each system may be utilized independently and separately from other components described herein. Each blade mapping system component can also be used in combination with other blade mapping system components.

While the invention has been described in terms of various specific embodiments, those skilled in the art will recognize that the invention can be practiced with modification within the spirit and scope of the claims.

What is claimed is:

1. A computer-implemented method of ordering blades in a rotatable machine that includes a plurality of blades that extend radially outwardly from a rotor, said method comprising:

receiving a geometric parameter measurement of each blade in a row of blades;

determining a root sum squared value of a difference of the geometric parameter measurement between adjacent blades in the row of blades;

determining a sequence map of each blade using the root sum squared value of the difference of the geometric parameter measurement between blades in the row of blades; and outputting the sequence map by displaying the blades on the rotor.

2. A method in accordance with claim 1 further comprising remapping the sequence of the blades to facilitate reducing the root summed squared value to a value that is less than a predetermined value.

3. A method in accordance with claim 2 further comprising:
determining a moment weight of each blade in a row of blades; and
determining a moment weight vector sum of the rotor.

4. A method in accordance with claim 3 wherein remapping the sequence of the blades comprises iteratively remapping the sequence of the blades to facilitate reducing the moment weight vector sum of the rotor to a value that is less than a pre-determined limit.

5. A method in accordance with claim 1 wherein each adjacent pair of blades define a volume that includes an inlet area extending between leading edges of each pair of blades and an exit area extending between the trailing edges of each pair of blades, wherein determining a geometric parameter measurement of each blade comprises determining a geometric parameter measurement of each blade that determines an inlet area to exit area ratio.

6. A method in accordance with claim 5 wherein determining a geometric parameter measurement of each blade that determines an inlet area to exit area ratio comprises determining a blade section stagger angle difference between adjacent blades.

7. A method in accordance with claim 5 wherein determining a geometric parameter measurement of each blade that determines an inlet area to exit area ratio comprises determining a tangential shift difference between adjacent blades.

8. A rotor assembly comprising:
a disk comprising a plurality of circumferentially-spaced blade root slots defined therein; and
a plurality of blades, each said blade comprising a root, a tip, and an airfoil therebetween, each said blade positioned within a pre-determined slot such that a root sum square of a variation of a geometric parameter measurement between each said blade and an adjacent blade is less than a pre-determined value, said pre-determined slot defined on a blade map, said blade map generated by a computer system configured to:
receive a geometric parameter measurement of each blade in a row of blades;
determine a root sum squared value of a difference of the geometric parameter measurement between adjacent blades in the row of blades; and
determine a sequence map of each blade using the root sum squared value of the difference of the geometric parameter measurement between adjacent blades in the row of blades.

9. A rotor assembly in accordance with claim 8 wherein said computer system is further configured to:
remap the sequence of the blades to facilitate reducing the root summed squared value to a value that is less than a pre-determined value;
determine a moment weight of each blade in a row of blades;
determine a moment weight vector sum of the rotor; and
iteratively remap the sequence of the blades to reduce the moment weight vector sum of the rotor to a value less than a pre-determined limit.

10. A rotor assembly in accordance with claim 8 wherein said plurality of blades are composite fan blades.

11. A rotor assembly in accordance with claim 8 wherein said computer system is further configured to determine an inlet area to exit area ratio between each pair of adjacent blades.

12. A rotor assembly in accordance with claim 8 wherein said computer system is further configured to determine a blade section stagger angle difference between adjacent blades.

13. A rotor assembly in accordance with claim 8 wherein said computer system is further configured to determine a tangential shift difference between adjacent blades.

14. A computer system comprising a software product code segment for minimizing imbalance in a bladed rotor, said segment configured to:
receive a geometric parameter measurement of each blade in a row of blades;
determine a root sum squared value of a difference of the geometric parameter measurement between adjacent blades in the row of blades;
determine a sequence map of each blade using the root sum squared value of the difference of the geometric parameter measurement between adjacent blades in the row of blades; and
output the sequence map by displaying the blades on the rotor.

15. A computer system in accordance with claim 14 wherein said software product code segment is configured to iteratively remap the sequence of the blades to facilitate reducing the root summed squared value to a value that is less than a pre-determined value.

16. A computer system in accordance with claim 14 wherein said software product code segment is configured to:
determine a moment weight of each blade in a row of blades;
determine a moment weight vector sum of the rotor; and
iteratively remap the sequence of the blades to reduce the moment weight vector sum of the rotor to a value less than a pre-determined limit.

17. A computer system in accordance with claim 14 wherein said software product code segment is configured to determine an inlet area to exit area ratio between each pair of adjacent blades.

18. A computer system in accordance with claim 14 wherein said software product code segment is configured to determine a blade section stagger angle difference between adjacent blades.

19. A computer system in accordance with claim 14 wherein said software product code segment is configured to determine a tangential shift difference between adjacent blades.

20. A computer system in accordance with claim 14 wherein said software product code segment is configured to generate a blade map that maps each blade into a respective rotor slot that facilitates reducing a combination of a root sum squared value of the difference of a blade section stagger angle between adjacent blades in the row of blades, and a moment weight vector sum value of said rotor to values that are less than respective pre-determined values.

* * * * *

UNITED STATES PATENT AND TRADEMARK OFFICE
CERTIFICATE OF CORRECTION

PATENT NO. : 7,090,464 B2  Page 1 of 1
APPLICATION NO. : 10/889945
DATED : August 15, 2006
INVENTOR(S) : Henning et al.

It is certified that error appears in the above-identified patent and that said Letters Patent is hereby corrected as shown below:

Column 6, line 66, between "between" and "blades" insert -- adjacent --.
Column 7, line 6, delete "predetermined" insert therefor -- pre-determined --.

Signed and Sealed this

Twenty-seventh Day of November, 2007

JON W. DUDAS
*Director of the United States Patent and Trademark Office*

UNITED STATES PATENT AND TRADEMARK OFFICE
CERTIFICATE OF CORRECTION

PATENT NO. : 7,090,464 B2 Page 1 of 1
APPLICATION NO. : 10/889945
DATED : August 15, 2006
INVENTOR(S) : Henning et al.

It is certified that error appears in the above-identified patent and that said Letters Patent is hereby corrected as shown below:

Column 6, line 66, between "between" and "blades" insert -- adjacent --.
Column 7, line 6, delete "predetermined" insert therefor -- pre-determined --.

Signed and Sealed this

Eighteenth Day of December, 2007

JON W. DUDAS
*Director of the United States Patent and Trademark Office*